(12) United States Patent
Käll et al.

(10) Patent No.: US 11,198,258 B2
(45) Date of Patent: Dec. 14, 2021

(54) METHOD AND DEVICE FOR ANCHORING AN INSERT IN A STRUCTURE BY USING A VIBRATION DEVICE

(71) Applicants: IKEA SUPPLY AG, Pratteln (CH); WoodWelding SA, Stansstad (CH)

(72) Inventors: Håkan Käll, Älmhult (SE); Muthumariappan Sankaran, Älmhult (SE); Mario Lehmann, Les Pommerats (CH); Laurent Torriani, Lamboing (CH)

(73) Assignees: IKEA Supply AG, Pratteln (CH); WoodWelding SA, Stansstad (CH)

( * ) Notice: Subject to any disclaimer, the term of this patent is extended or adjusted under 35 U.S.C. 154(b) by 346 days.

(21) Appl. No.: 16/085,521

(22) PCT Filed: Mar. 7, 2017

(86) PCT No.: PCT/SE2017/050208
§ 371 (c)(1),
(2) Date: Sep. 14, 2018

(87) PCT Pub. No.: WO2017/160202
PCT Pub. Date: Sep. 21, 2017

(65) Prior Publication Data
US 2020/0298504 A1 Sep. 24, 2020

(30) Foreign Application Priority Data
Mar. 15, 2016 (SE) .................................. 1650347-6

(51) Int. Cl.
*B32B 41/00* (2006.01)
*B29C 65/00* (2006.01)
(Continued)

(52) U.S. Cl.
CPC .......... *B29C 66/872* (2013.01); *B29C 65/645* (2013.01); *B29C 66/30325* (2013.01);
(Continued)

(58) Field of Classification Search
CPC ................ B29C 66/872; B29C 65/645; B29C 66/30325; B29C 66/474; B29C 66/7392;
(Continued)

(56) References Cited

U.S. PATENT DOCUMENTS 4,631,685 A 12/1986 Peter
6,913,666 B1 7/2005 Aeschlimann et al.
(Continued)

FOREIGN PATENT DOCUMENTS

DE 2557966 A1 6/1977
DE 4317621 C1 6/1994
(Continued)

OTHER PUBLICATIONS

Extended European Search Report for EP Application No. 17767058.5 dated Oct. 1, 2019 (9 pages).
(Continued)

*Primary Examiner* — Michael N Orlando
*Assistant Examiner* — Joshel Rivera
(74) *Attorney, Agent, or Firm* — Merchant & Gould P.C.

(57) ABSTRACT

A device for joining material by anchoring an insert comprising a first material in a structure comprising a second material is provided. The first material is solid and comprises thermoplastic properties and the second material is solid and is penetrable by the first material when in a liquefied state. The device comprises a vibration device being configured to transmit vibrations to said insert to cause at least partial liquefaction thereof and being arranged to move, relative to said structure, along an insertion direction (ID) to insert said insert at least partly into said structure, a
(Continued)

contact sensor being connected to the vibration device and being adapted to move together with the vibration device along the insertion direction (ID), the contact sensor having a sensor body being adapted to detect contact with said structure. A controller is further connected to the contact sensor and adapted for receiving a contact signal from the contact sensor indicating that the sensor body has come into contact with said structure.

23 Claims, 8 Drawing Sheets

(51) Int. Cl.
*B29C 65/64* (2006.01)
*F16B 5/08* (2006.01)
*F16B 12/22* (2006.01)
*B29L 31/44* (2006.01)

(52) U.S. Cl.
CPC ........ *B29C 66/474* (2013.01); *B29C 66/7392* (2013.01); *B29C 66/7486* (2013.01); *B29C 66/7487* (2013.01); *B29C 66/81463* (2013.01); *B29C 66/9231* (2013.01); *B29C 66/92651* (2013.01); *F16B 5/08* (2013.01); *F16B 12/22* (2013.01); *B29L 2031/44* (2013.01)

(58) Field of Classification Search
CPC ............ B29C 66/7486; B29C 66/7487; B29C 66/81463; B29C 66/9231; B29C 66/92651; B29C 66/8242; B29C 65/08; B29C 66/131; B29C 66/21; B29C 66/30326; B29C 66/727; B29C 66/8322; B29C 66/843; B29C 66/8432; B29C 66/874; B29C 66/9241; B29C 65/56; F16B 5/08; F16B 12/22; F16B 5/0614; F16B 13/00; F16B 12/24; B29L 2031/44; A47B 2230/11
USPC ................... 156/60, 64, 350, 351, 378, 379
See application file for complete search history.

(56) References Cited

U.S. PATENT DOCUMENTS

| | | | |
|---|---|---|---|
| 2005/0126680 A1* | 6/2005 | Aeschlimann et al. | ..................... B29C 66/112 156/73.1 |
| 2014/0205373 A1 | 7/2014 | Andersson et al. | |
| 2017/0043525 A1* | 2/2017 | Wiethoff et al. ...... | B29C 65/645 |

FOREIGN PATENT DOCUMENTS

| | | |
|---|---|---|
| WO | WO 1998/42988 | 10/1998 |
| WO | 0079137 A1 | 12/2000 |
| WO | WO 2015/162029 A1 | 10/2015 |
| WO | 2015181300 A1 | 12/2015 |
| WO | WO 2015/181300 A1 | 12/2015 |
| WO | WO 2015/181301 A1 | 12/2015 |
| WO | 2016054751 A1 | 4/2016 |

OTHER PUBLICATIONS

International Search Report and Written Opinion for PCT/SE2017/050208 dated Apr. 26, 2017.

* cited by examiner

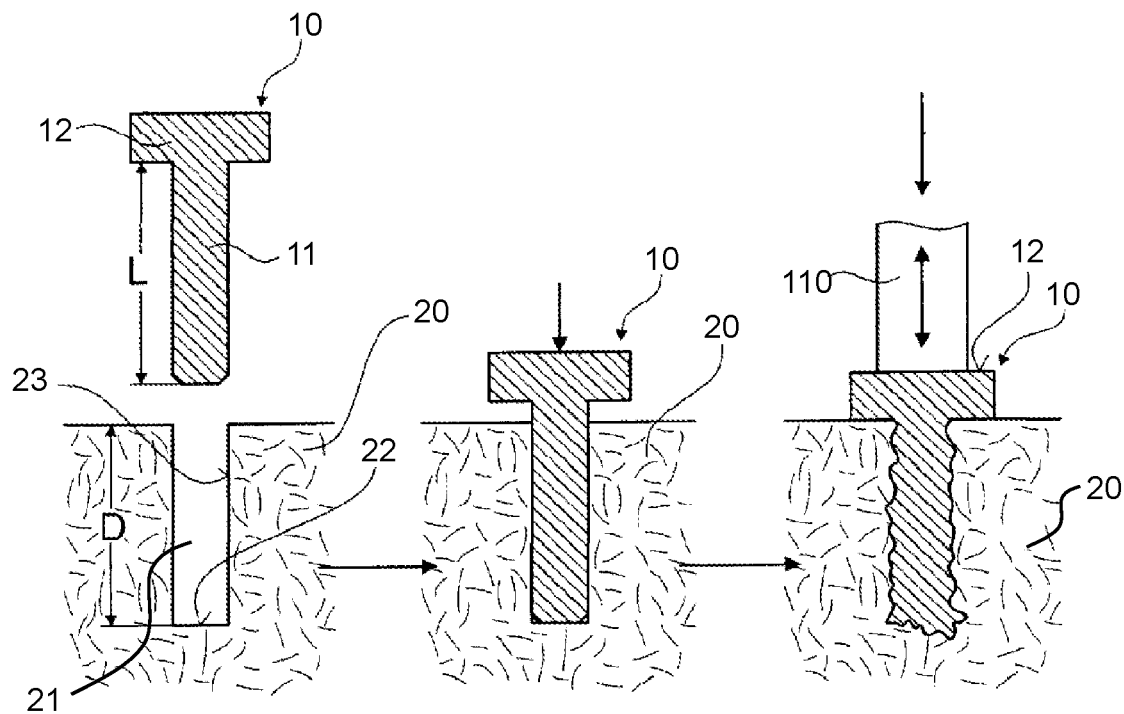
Fig. 3
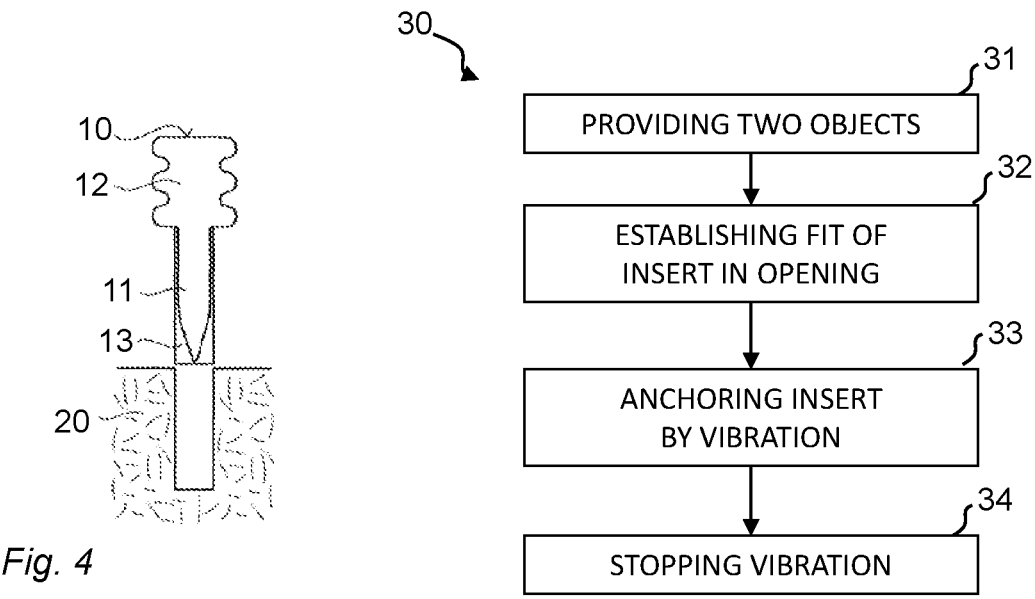
Fig. 4
Fig. 5

US 11,198,258 B2

METHOD AND DEVICE FOR ANCHORING AN INSERT IN A STRUCTURE BY USING A VIBRATION DEVICE

This application is a National Stage Application of PCT/SE2017/050208, filed 7 Mar. 2017, which claims the benefit of priority to Swedish Patent Application No. 1650347-6, filed 15 Mar. 2016, which applications are incorporated herein by reference. To the extent appropriate, a claim of priority is made to each of the above disclosed applications.

TECHNICAL FIELD

The present invention relates to a device and a method of joining material, such as fibrous or porous material. More particularly, the present invention relates to a device and a method for position control in such material joining processes.

BACKGROUND

Joining material may be accomplished in various ways. For fibrous or porous materials a material joining process involving mechanical vibrations, for example ultrasonic vibrations, a process sometimes referred to as Woodwelding® technology, as described in, e.g., WO1998/42988, has been developed.

Woodwelding® technology has been proven to be highly advantageous for securely fixing inserts in a fibrous or porous structure. The general principle of Woodwelding® technology requires a thermoplastic material arranged somewhere in the insert/structure interface. By applying mechanical vibration, e.g. by means of an ultrasonic vibration device, to the thermoplastic material friction forces will be generated causing heat generation and consequently melting of the thermoplastic material. The insert is pushed into a recess of the structure while the thermoplastic material is at least partly in liquid phase, whereafter the thermoplastic material is allowed to re-solidify as soon as the mechanical vibration is removed and once the insert is held in the correct position.

Further examples of details of different Woodwelding® technology processes are described in, e.g., WO2015/181300.

For high quality applications, such as furniture manufacturing, it is important to ensure a correct position of the insert relative the fibrous or porous structure after the joining process. Controlling the final position of the insert thus requires accurately controlling the movement of the insert into the structure during the joining process. For solving this problem it has been suggested to utilize a reference member which is moveable into contact with an edge of the fibrous or porous structure. A vibration device is allowed to move in an insertion direction, i.e. towards the structure, and is used not only to provide mechanical vibrations but also for applying a pressing force to the insert to press it into the structure. The longitudinal distance between the outer edge of the vibration device and the reference member is determined before moving the vibration device, as well as the desired longitudinal distance between the reference member and the outer edge of the insert when the insert is finally joined to the structure, i.e. the length of the insert intended for protruding outside the structure. The longitudinal direction thus corresponds to the insertion direction. By moving the vibration device towards the structure the motion will end once the distance between the vibration device and the reference member equals the desired distance. Hence, at this position the insert has reached its desired position relative the structure.

Although the above-mentioned method allows for a precise positioning of a single insert, the accuracy will depend on the position of the reference member. If the reference member for some reason is not in close contact with the structure, the final position of the insert will not be correct. Furthermore, the method described above will also give rise to some drawbacks when two or more inserts are to be attached to a common structure. If there is a small misalignment of the structure the reference member will not provide a well-defined position relative the recesses in the structure which are about to receive the inserts. Consequently, at most only one of the inserts will have a correct position when finally joined to the structure.

Hence, there is a need for an improved device and method of joining material, in particular when applying Woodwelding® technology for anchoring of inserts to a structure of fibrous or porous material.

SUMMARY

An object of the present invention is thus to provide an improved method and device for joining material, in particular for anchoring an insert to a structure of fibrous or porous material.

According to a first aspect, a device for joining material by anchoring an insert comprising a first material in a structure comprising a second material is provided. The first material is solid and comprises thermoplastic properties and the second material is solid and is penetrable by the first material when in a liquefied state. The device comprises a vibration device being configured to transmit vibrations to said insert to cause at least partial liquefaction thereof and being arranged to move, relative to said structure, along an insertion direction ID to insert said insert at least partly into said structure, a contact sensor being connected to the vibration device and being adapted to move together with the vibration device along the insertion direction ID, the contact sensor having a sensor body being adapted to detect contact with said structure, and a controller connected to the contact sensor and adapted for receiving a contact signal from the contact sensor indicating that the sensor body has come into contact with said structure, the controller comprising control means for interrupting, based on receipt of said signal, at least one of: i) a movement of the vibration device along the insertion direction ID, and ii) a transmission of vibrations from the vibration device to said insert.

An advantage of this device is that it allows for a more accurate anchoring of an insert in a structure, in particular there is an improved detection of the correct position on dusty, uneven and/or porous surfaces.

Said vibration device may be an ultrasonic vibration device.

In an embodiment, a lateral distance L1, as measured in a direction being perpendicular to the insertion direction ID, between a centerline C1 of the vibration device and a centerline C2 of the contact sensor is less than seven, more preferably less than five, times a maximum lateral width L2, as measured in a direction being perpendicular to the insertion direction ID, of said insert [L1<7×L2, more preferably L1<5×L2]. An advantage of this embodiment is that the contact between the contact sensor and the structure is made very close to the point where the insert is inserted into the structure, thereby the contact of the contact sensor provides an accurate indication of the position of the structure in the area of the insert.

In an embodiment the lateral distance (L1) is less than 70 mm, more preferably less than 50 mm. These distances have been found to provide for accurate detection of contact between the contact sensor and the structure, being accurate with regard to the position of the insert in relation to the structure. Thereby, the insert can be anchored in the structure with a high precision.

The contact sensor may have a position detection repeat accuracy, as seen in the insertion direction ID, of better than 20 micrometer, preferably better than 10 micrometer, and most preferably better than 5 micrometer. In an embodiment, the contact sensor has a response time of less than 3 milliseconds, preferably less than 1 millisecond. This provides for accurate positioning of the insert in the structure.

The sensor body preferably has a structure contact area SA of at least 5 $mm^2$, more preferably at least 10 $mm^2$. Thereby, the risk is reduced that the sensor body penetrates into porous structures, or detects a contact with the structure which is not relevant for the positioning of the insert. Furthermore, the sensor contact area is preferably not larger than 200 $mm^2$, still more preferably not larger than 150 $mm^2$. This provides for accurate detection of a contact with the structure which is relevant with regard to the insert.

The vibration device may comprise an insert contact surface for transmitting vibrations to said insert, the sensor body being positioned at a distance d1, as seen along the insertion direction ID, from the insert contact surface of said vibration device, wherein the distance d1 between the insert contact surface of the vibration device and the sensor body of the sensor corresponds to a height H1 at which said insert is intended to extend from the structure in said insertion direction ID after said insert has been anchored in said structure.

In an embodiment the control means is adapted for interrupting, based on receipt of said signal, both i) the movement of the vibration device along the insertion direction ID, and ii) the transmission of vibrations from the vibration device to said insert.

Said contact sensor may comprise a housing enclosing a first electrode being fix relative to the housing, and a second electrode being connected to the sensor body and being movable relative to the housing.

The second electrode may be attached to the sensor body being a moving member being biased to protrude outside said housing.

In an embodiment the first and second electrodes, are in contact when there is no contact force from said structure acting on the moving member.

In an embodiment the first and second electrodes, are in non-contact when there is no contact force from said structure acting on the moving member.

The device may further comprise a support allowing the vibration device and the sensor to move towards and away from said structure along the insertion direction ID, preferably said support comprising a pneumatic cylinder, a linear drive motor or a hydraulic cylinder for actuating said motion along the insertion direction ID. All of these devices are efficient in moving the vibration device in relation to the structure. In particular pneumatic and hydraulic devices have the additional benefits of making it easy to maintain a force acting on the insert after the transmission of vibrations has been interrupted, whereby the initial solidification of the insert may occur under pressure on the insert. Still further, pneumatic and hydraulic devices have the additional advantage of causing movement of the insert into the structure as the liquefaction of the insert progresses.

In an embodiment the device further comprises a gas supply having a flushing gas outlet located adjacent to the sensor body for gas-flushing the structure in front of the sensor body of the sensor.

According to a second aspect a method for joining material by anchoring an insert comprising a first material in a structure comprising a second material, such as a fibrous or porous material is provided. The first material is solid and comprises thermoplastic properties and wherein the second material is solid and is penetrable by the first material when in a liquefied state. The method comprises aligning a vibration device with an insert; controlling said vibration device to transmitting vibrations, to cause at least partial liquefaction of said insert, as well as generating a pressing force in an insertion direction ID to said insert to press said insert at least partly into said structure; detecting when a sensor, which is connected to said vibration device and which moves together with the vibration device in the insertion direction ID, contacts said structure into which the insert is pressed, and interrupting at least one of said transmitting of vibrations and said generation of a pressing force by said vibration device once the contact between the sensor and said structure is detected.

The step of interrupting at least one of said transmitting of vibrations and said generation of a pressing force by said vibration device once the contact between the sensor and said structure is detected may involve interrupting both said transmitting of vibrations and said generation of a pressing force.

The step of detecting a contact with the structure may involve detecting said contact at a lateral distance L1, as measured in a direction being perpendicular to the insertion direction ID, between a centerline C1 of the vibration device and a centerline C2 of the contact sensor of less than seven, more preferably less than five, times a maximum lateral width L2, as measured in a direction being perpendicular to the insertion direction ID, of said insert [L1<7×L2, more preferably L1<5×L2].

The step of detecting when the sensor contacts said structure may be performed using a position detection repeat accuracy of the sensor, as seen in the insertion direction ID, of better than 20 micrometer, preferably better than 10 micrometer, and most preferably better than 5 micrometer.

The step of detecting when the sensor contacts said structure may be performed using a sensor response time of less than 3 milliseconds, more preferably less than 1 millisecond.

An area of the structure in front of the contact sensor may be flushed with a flushing gas.

The method may further comprise setting a distance d1 between an insert contact surface of the vibration device and a sensor body of the sensor such that it corresponds to a height H1 at which said insert is intended to extend from the structure in said insertion direction ID after said insert has been anchored in said structure.

The structure may comprise a wood based material, such as wood, plywood, chipboard, cardboard, medium or high density fiber board MDF, HDF.

The insert may be a dowel for later use as a male part of a furniture joint formed when joining the structure being a furniture piece to a further furniture piece.

In an embodiment the insert is a dowel for later use as a female part of a furniture joint formed when joining the structure being a furniture piece to a further furniture piece.

BRIEF DESCRIPTION OF DRAWINGS

The invention will be described in further detail below under reference to the accompanying drawings, in which

FIG. 3 is a schematic side view of the joining process provided by a method according to an embodiment;

FIG. 4 is a side view of an insert and a structure for use with a device and method according to various embodiments;

FIG. 5 is a schematic view of a method for joining material;

DETAILED DESCRIPTION

In the following description different embodiments of methods and devices for joining material will be discussed. Before turning into the details of such devices and methods, some general comments will be given of typical, but not limiting applications for this kind of material joining technique.

Figure 1:
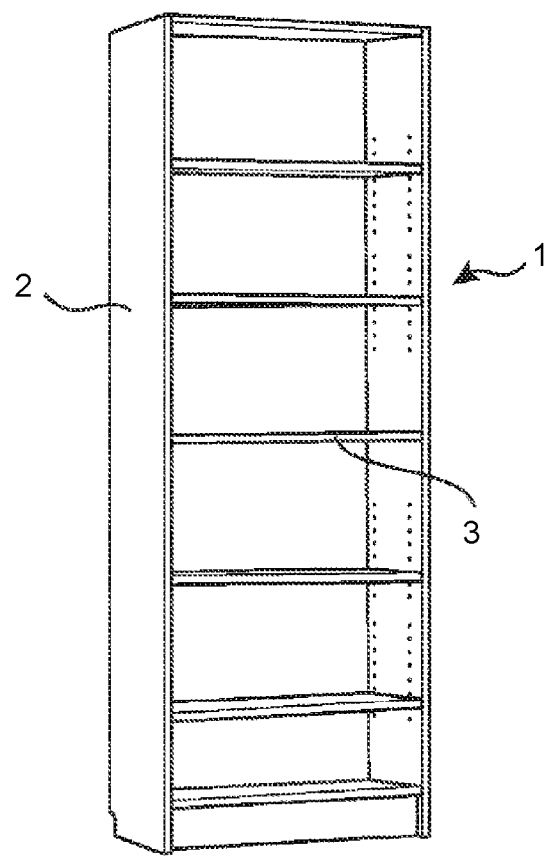
FIG. 1 is an isometric view of a book shelf being assembled by joining furniture pieces, in which at least one furniture piece comprises a structure and an insert joined thereto.
Figure 2:
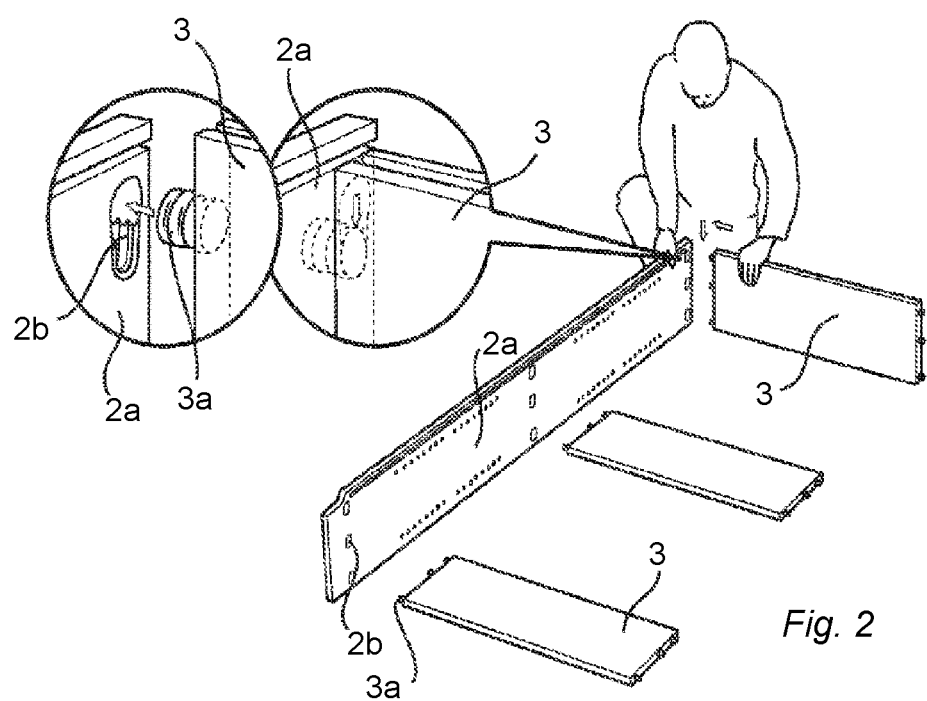
FIG. 2 is an overview of the assembly procedure required for the book shelf shown in FIG. 1, wherein the furniture pieces are shown in more detail.

In FIG. 1 a book shelf 1 is shown having a frame structure 2 and a plurality of shelves 3 extending horizontally within the frame structure 2. Assembly of the book shelf 1 is shown in FIG. 2, where a side piece 2a of the frame structure 2 has several recesses 2b for receiving mating protrusions 3a of the furniture pieces 3 later forming the shelves. Thus, the mating protrusions 3a of the shelves 3 form male parts of furniture joints. In FIG. 2 the mating protrusions 3a are wedge dowels, joined to the shelves 3 by a material joining process.

The particular wedge dowel furniture joint shown in FIG. 2 will not be described in further details herein. Features and advantages of such furniture joints are described in, e.g., US2014/205373, see for example FIGS. 14a-14h of that document.

Now turning to FIG. 3 of the present application the general principle of joining material is shown. Starting at the left-most illustration, an insert 10 is about to be joined with a structure 20. The structure 20 is made of a porous or fibrous material as will be further described below. A recess 21 is provided in the structure 20, whereby the recess 21, or blind opening, is accessible from one edge of the structure 20. The recess 21 has a depth D from its opening to its bottom wall 22, and the width of the recess 21 is defined by lateral walls 23. At least some portions of the lateral walls 23 and/or the bottom wall 22 comprise a penetrable material for absorbing the liquefied thermoplastic material of the insert 10.

The insert 10 shown in FIG. 3 has an insertion portion 11 and a proximal portion 12, which proximal portion will form a protrusion outside the structure 20 once the insert 10 has been fully joined to the structure 20. Some part of the insertion portion 11, or the entire insertion portion 11, may be formed by a thermoplastic material.

The insert 10 is at least partly urged into the recess 21 of the structure 20 for establishing a temporary fit. This is shown in the central illustration of FIG. 3. For example, the temporary fit may be an interference fit achieved by pressing the insert 10 into the recess 21, wherein the insertion portion 11 is slightly larger in cross section than the recess 21, thereby resulting in an interference fit. For joining the material, i.e. for joining the insert 10 and the structure 20 to each other, mechanical vibration is applied to the thermoplastic material via e.g. an ultrasonic vibration device 110. The vibration device 110 is pressed against the proximal portion 12 of the insert 10 whereby the vibration will cause friction forces between the thermoplastic material and the material of the structure 20, eventually causing at least partial melting of the thermoplastic material of the insertion portion 11. While pressing the insert 10 towards the structure 20 the insert 10 will move further down into the recess 21. The thermoplastic material will to some extent flow into the lateral walls 23 and/or the bottom wall 22 of the recess 21, thus forming a very rigid connection between the two materials once the vibrational force is stopped and the thermoplastic material is allowed to re-solidify.

In FIG. 3 the entire insertion portion 11 of the insert 10 is made of a thermoplastic material, and so is the proximal portion 12. In FIG. 4 another example is shown, wherein only a part 13 of the insertion portion 11 is formed by a thermoplastic material.

For all embodiments described herein the structure 20 is preferably made of a porous or fibrous material. Porous and fibrous materials are penetrable to liquefied thermoplastic material. Examples of materials useful in the present method and of particular interest in furniture manufacturing applications are wood-based materials such as chipboard), or wood, or metallic or ceramic foams or possibly open.

As mentioned above, the thermoplastic material and the penetrable material taking part in the anchorage may be present only on selected surfaces of the insert portion and on walls of the opening. However they may also constitute larger portions of the two objects which may comprise further portions of different materials or may fully consist of either the thermoplastic material or the penetrable material.

Examples of penetrable materials applicable in the embodiments described herein are solid materials such as wood, plywood, chipboard ("chipboard" in this text includes any composite materials manufactured by mixing wood particles of any shape with adhesives, independent of the product's shape, including for example oriented strand board, particle board, High Density Fiber board (HDF) and Medium Density Fiber board (MDF)), cardboard, concrete brick material, porous glass, foams of metal, ceramic, or polymer materials, or sintered ceramic, glass or metal materials, porous structures of a material based on a not thermoplastic (thermosetting) polymer, thermoplastic polymers, wherein such materials comprise spaces into which the thermoplastic material can penetrate which spaces are originally filled with air or with another displaceable or compressible material. Further examples are composite materials which have the above stated properties or materials with surfaces comprising a suitable roughness, suitable machined surface structures or suitable surface coatings (e.g. consisting of particles). If the penetrable material has thermoplastic properties, e.g. if the penetrable material is a thermoplastic polymer, it is necessary that it maintains its mechanical strength during the anchoring step either by further comprising a mechanically stable phase or by having a considerably higher melting temperature than the thermoplastic material to be liquefied in the anchoring step.

A penetrable material suitable for the various embodiments described herein is solid at least under the conditions of establishing the fit and the anchoring, wherein "solid" in the context of the present disclosure is to mean that this material is rigid, substantially not elastically flexible (no elastomer characteristics) and not plastically deformable and it is not or only very little elastically compressible. It further comprises (actual or potential) spaces into which the liquefied material can flow or be pressed for the anchoring. It is e.g. fibrous or porous or comprises penetrable surface structures which are e.g. manufactured by suitable machining or by coating (actual spaces for penetration). Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material which can be forced out of the pores, a composite of a soft material and a hard material or a heterogeneous material (such as wood) in which the interfacial adhesion between the constituents is smaller than the force exerted by the penetrating liquefied material. Thus, in general, the penetrable material comprises an inhomogeneity in terms of structure ("empty" spaces such as pores, cavities etc.) or in terms of material composition (displaceable material or separable materials).

A thermoplastic material suitable for the different embodiments described herein is, under the conditions of establishing the fit, also solid in the sense as above described for the penetrable material. It preferably comprises a polymeric phase (especially C, P, S or Si chain based) that transforms from solid into liquid or flowable above a critical temperature range, for example by melting, and transforms into a solid material when again cooled below the critical temperature range, for example by crystallization, whereby the viscosity of the solid phase is several orders of magnitude (at least three orders of magnitude) higher than of the liquid phase. The thermoplastic material will generally comprise a polymeric component that is not cross-linked covalently or cross-linked in a manner that the cross-linking bonds open reversibly upon heating to or above a melting temperature range. The polymer material may further comprise a filler, e.g. fibers or particles of material which has no thermoplastic properties or has thermoplastic properties including a melting temperature range which is considerably higher than the melting temperature range of the basic polymer.

Examples for the thermoplastic material applicable for the embodiments described herein are thermoplastic polymers, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonateurethane, polycarbonates or polyester carbonates, acrylonitrile butadiene styrene (ABS), Acrylester-Styrol-Acrylnitril (ASA), Styreneacrylonitrile, polyvinyl chloride, polystyrene, or Polyetherketone (PEEK), Polyetherimide (PEI), Polysulfon (PSU), Poly(p-phenylene sulfide) (PPS), or Liquid crystall polymers (LCP).

The energy necessary for liquefying the thermoplastic material in the anchoring step is supplied, as above discussed, to either one of the two objects preferably in the form of mechanical vibration, in particular ultrasonic vibration, to be transformed into friction heat at the interface between the insertion portion and the wall of the opening. The vibration preferably has a main vibration direction parallel to the surfaces of the insertion portion and opening wall where the fit is active. Preferred therefore are, for achieving lateral anchorage, longitudinal vibrations substantially parallel to the depth of the opening or rotary vibrations with an axis substantially parallel to the depth of the opening. An additional shearing force, if applied, is preferably directed parallel to the main vibration direction, i.e. it acts parallel to the depth of the opening or as torque with an axis parallel to the depth of the opening.

Usually either one of the materials to be joined (i.e. the insert 10 and the structure 20) needs to be able to transfer the vibration energy, preferably with a minimum of energy loss, from a proximal object side, where a vibrating tool is applied, to a distal side, where the insertion portion or the opening is arranged. If this object is fully made of the thermoplastic material the latter will need an elasticity coefficient (at ambient temperature) of at least 0.5 GPa, or preferably of at least 1.0 GPa.

Mechanical vibration or oscillation suitable for the embodiments described herein has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode or ultrasonic vibration device) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from Woodwelding® technology.

The general principles of a material joining method 30 are shown in FIG. 5, schematically illustration a first step 31 of providing two objects, i.e. the insert 10 and the structure 20. In a next step 32 a temporary fit is established between the insert 10 and the structure 20. In a subsequent step 33 the insert 10 is connected to the structure 20 by applying vibration to the thermoplastic material to make the thermoplastic material of the insert 10 at least partly liquefied, and such liquefied material penetrates into the structure 20, as the latter comprises penetrable material. Thereafter, in step 34, the vibration is stopped thus allowing the thermoplastic material of the insert 10 to re-solidify in order to achieve the desired anchoring, or joining, of the insert 10 and the structure 20.

It should be noted that the step 32 of providing a temporary fit may be performed not as a separate method step, but as the initial part of the subsequent step 33. In such embodiment there may be no recess in the structure 20, but the insert 10 may be pressed directly into the structure 20 when vibration and a pressing force is applied to the insert. In such embodiment the step 32 of establishing a fit of the insert in an opening of the structure 20 corresponds to the small time window when the insert 10 is establishing fit with the structure 20.

Figure 6A:
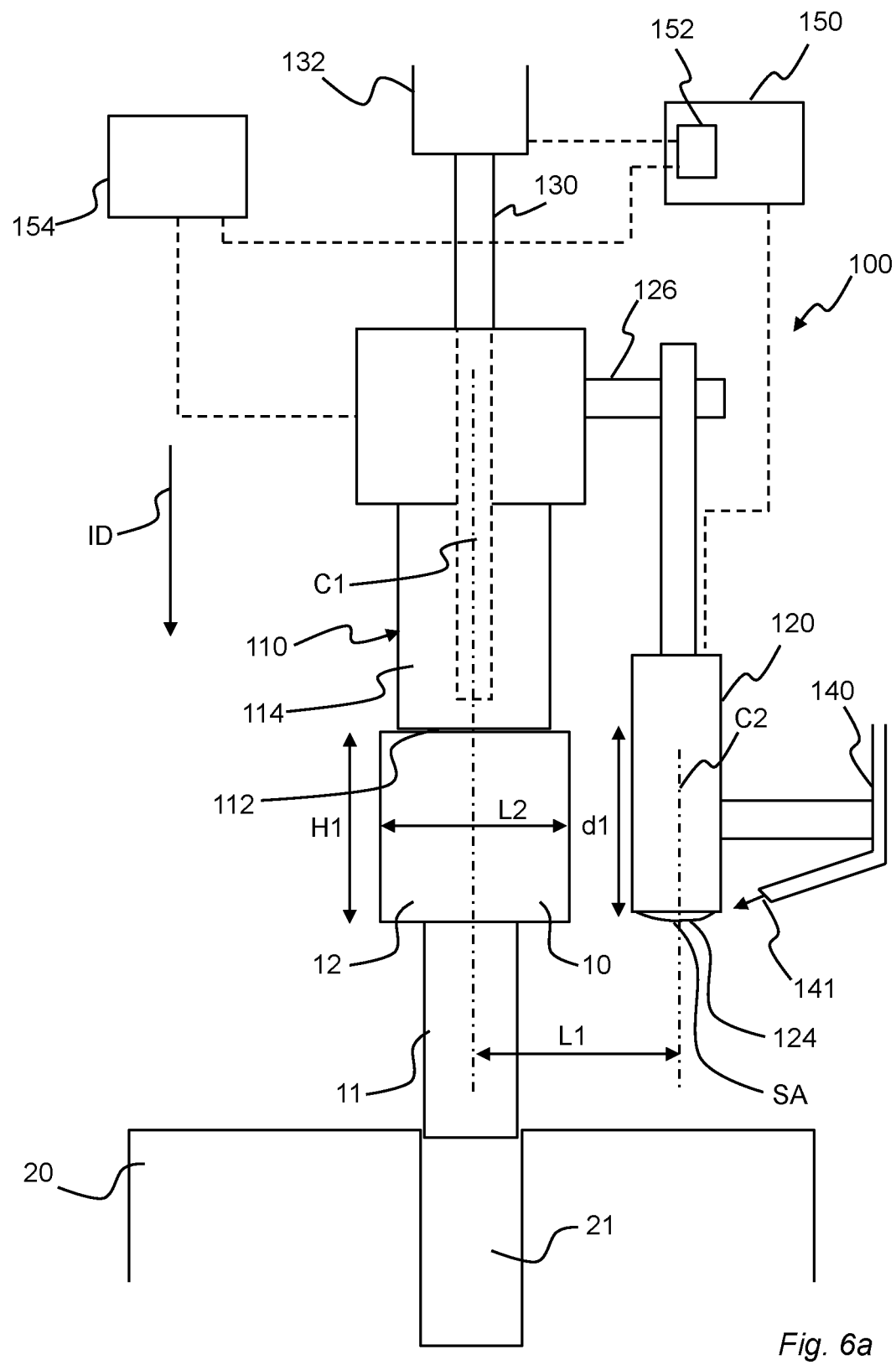
FIGS. 6a-b are schematic side views of a device according to an embodiment.

Now turning to FIG. 6a a device 100 for joining material is shown. The device 100 comprises the vibration device 110 and a sensor 120. The vibration device 110 is configured to generate mechanical vibration to a thermoplastic material provided at least in the interface between the insert 10 and the structure 20, as well as to move, along an insertion direction ID, towards and away from the structure 20 in order to apply a pressing force to the insert 10 during operation. For this purpose the device 100 preferably also comprises a support 130 allowing the vibration device 110 to move towards and away from said structure 20. The support 130 may, e.g., include a pneumatic cylinder 132, a hydraulic cylinder, a linear drive motor or similar for moving the vibration device 110 towards and away from the structure 20.

The sensor 120 is preferably a contact sensor 120 having a sensor body 124 being positioned at a predetermined distance d1, as seen along the insertion direction ID, from an insert contact surface 112 of the vibration device 110, wherein the insert contact surface 112 is that surface which comes into contact with the insert 10 and pushes the insert into the structure 20. In case the vibration device 110 is an ultrasonic vibration device 110 the insert contact surface 112 is typically the end surface of a horn 114 transmitting ultrasonic vibration from the ultrasonic vibration device 110 to the insert 10. The predetermined distance d1 is selected so as to correspond to that length of the insert 10 which is intended to extend from the structure 20 after the insert 10 and the structure 20 have been joined to each other. The predetermined distance d1 is preferably adjustable, and should correspond to a height H1 at which said insert 10 is intended to extend from the structure 20 in said insertion direction ID after said insert 10 has been anchored in said structure 20. For example, if the outer end of the insert 10 is supposed to extend a height H1 of 5.5 mm from the structure 20 after being joined thereto, then the distance d1 is set to 5.5 mm. If, as a further example, the insert 10 is supposed to be flush with the structure 20 after being joined thereto, meaning H1=0 mm, then the distance d1 is set to 0 mm, meaning that the surface 112 and the sensor body 124 are located in the same plane, as seen along the insertion direction ID. According to a still further example the insert 10 is supposed to be located entirely inside the structure 20 after being joined thereto, meaning, for example, H1=−1 to −5 mm. Hence, according to this embodiment the surface 112 is located closer to the structure 20 than the sensor body 124, wherein the anchoring process is not finalized by a contact between the sensor body 124 and the structure 20 until the insert 10 has been pushed entirely into the structure 20 and is even entirely located below the surface of the structure 20. In this latter case the vibration device 110 is of such a size that it can pass partly into the recess 21 provided in the structure 20 when moving the insert 10 into the structure 20.

The sensor body 124 has a structure contact area SA, illustrated in FIG. 6a, which comes into contact with the structure 20. The structure contact area SA provides an averaging effect, meaning that a representative and accurate contact can be determined also in porous materials, such as particle board. For this reason, the structure contact area SA is preferably not too small, because then the sensor body 124 might penetrate into the structure 20. Hence, the structure contact area SA is preferably at least 5 mm$^2$, more preferably at least 10 mm$^2$. Furthermore, the sensor contact area SA should also not be too large, because it may then come into contact with other arrangements which may reduce the accuracy. Hence, the sensor contact area SA is preferably not larger than 200 mm$^2$, still more preferably not larger than 150 mm$^2$.

Figure 6B:
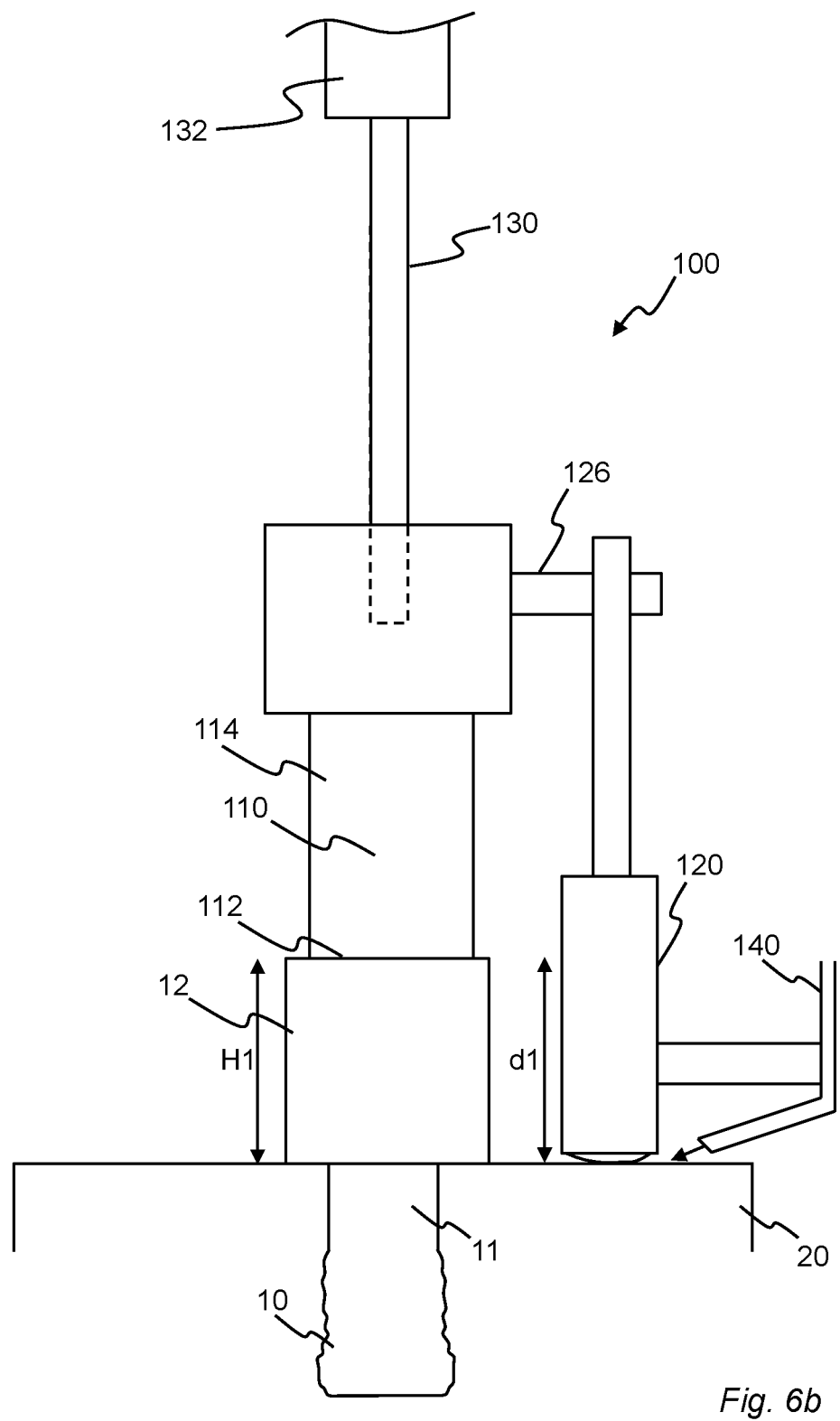

The predetermined distance d1 should be fix during movement of the vibration device 110. Hence, the sensor 120 will move in the same manner as the vibration device 110, and preferably the sensor 120 is physically connected to the vibration device 110, for example via a mounting bracket 126. This is shown in FIG. 6b, in which the device 100 has been operated to join the insert 10 to the structure 20. As can be seen, the vibration device 110 has urged the insert 10 into the structure 20 by pressing and simultaneously generating vibrations for causing the thermoplastic material to melt. When the sensor 120 comes into contact with the structure 20, at which position the insert 10 protrudes exactly the desired height H1 out from the structure 20, the movement of the vibration device 110 and/or the transmission of vibrations may be interrupted for finalizing the joining process by allowing the thermoplastic material to re-solidify. According to one embodiment the transmission of vibrations is interrupted shortly before the movement of the vibration device 110 is stopped, e.g. the movement may be interrupted 0.05 to 0.5 seconds after the transmission of vibrations has been interrupted. The advantage of this embodiment is that the short time period of movement of the vibration device 110, after the transmission of vibrations has already been interrupted, results in a pressing force holding the insertion portion 11 of the insert 10 in its intended place, at least until solidification of the insertion portion 11 has begun.

To obtain maximum accuracy in joining the insert 10 to the structure 20 with the height H1 after such joining being as close as possible to the desired value it is beneficial if the sensor 120 is located very close to the insert 10. Hence, as best shown in FIG. 6a, a lateral distance L1, as measured in a direction being perpendicular to the insertion direction ID, between a centerline C1 of the vibration device 110 and a centerline C2 of the contact sensor 120 is less than seven times a maximum lateral width L2, as measured in a direction being perpendicular to the insertion direction ID, of said insert 10, i.e. L1<7×L2. Typically, the maximum lateral width L2 would exist at the proximal portion 12 of the insert 10. More preferably L1<5×L2.

Preferably, the contact sensor 120 has a position detection repeat accuracy, as seen in the insertion direction ID, of better than 20 micrometer, preferably better than 10 micrometer, and most preferably better than 5 micrometer. According to one example, the sensor 120 may include a sensor of the type: Baumer My-com precision switch MY-COM L75N/S35L, which is available from Baumer Electric AG, Frauenfeld, Switzerland. This switch has a repeat accuracy of 1 micrometer. As will be elaborated more hereinafter, the switch can be built into a protective housing, with a separate contacting element arranged between the switch and structure 20, with which contact is to be detected. In such a case, a repeat accuracy of the contact sensor, being in such a case the combination of the switch, the protective housing and the separate contacting element, is still preferably better than 20 micrometer, more preferably better than 10 or even 5 micrometer.

Preferably, the contact sensor 120 has a response time, meaning the time between detecting contact and sending a signal to the controller 150, of less than 3 milliseconds, more preferably less than 1 millisecond.

As can be seen in FIGS. 6a and 6b a gas supply 140 may also be provided, comprising a flushing gas outlet or nozzle 141 located adjacent to the sensor body 124 for gas-flushing the sensor body 124 of the sensor 120 for removing any unwanted particles from the structure 20 or sensor 120, to thereby increase the accuracy of detecting a contact between the sensor body 124 and the structure 20. The flushing gas would typically be compressed air, although flushing with other gases, such as nitrogen gas, is also possible.

Figure 7:
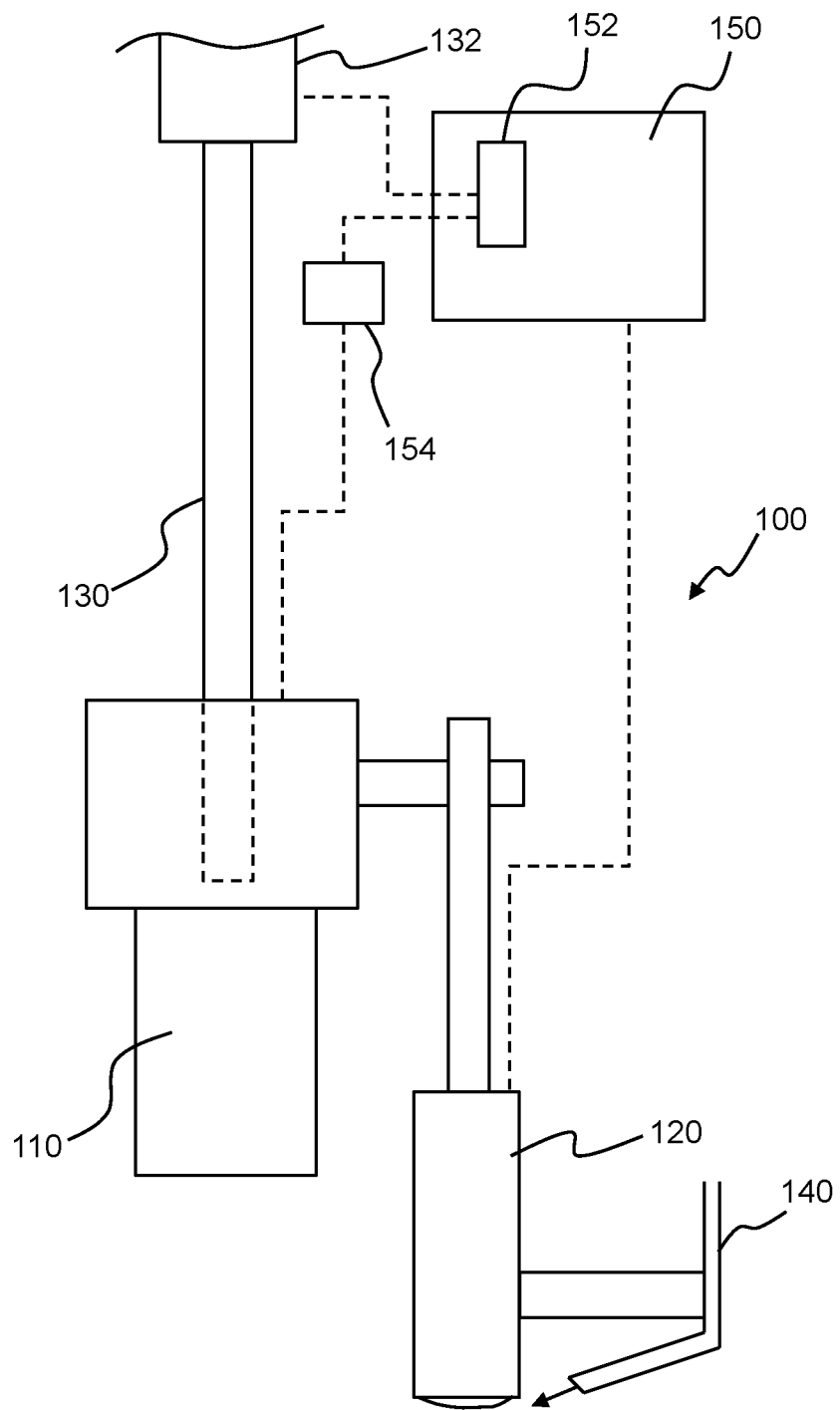
FIG. 7 is a schematic view of a device according to an embodiment.

In FIG. 7 another view of the device 100 according to an embodiment is shown. Except for the vibration device 110, the sensor 120, the support 130 and the air supply 140 the device 100 also comprises a controller 150 (see also FIG. 6a). The controller 150 is connected to the sensor 120 for detecting the immediate situation when the sensor body 124 of the sensor 120 comes into contact with the edge of the structure 20. Based on this, the controller 150 receives a signal from the sensor 120 and a control means 152, such as a microcomputer, of the controller 150 will generate and transmit control signals to power electronics 154 of the vibration device 110 to stop the transmission of vibrations. In addition thereto, or as alternative thereto, the controller 150 may also transmit a control signal to a linear drive unit 132 of the support 130 for terminating any inwards movement, i.e. to stop the vibration device 110 from pressing the insert 10 towards the structure 20 in the insertion direction ID. An additional control of the air supply 140 may also be provided by means of the controller 150, although not illustrated in FIG. 7.

Different embodiments of the sensor 120 are shown in FIGS. 8a-b and FIGS. 9a-b. Common for both embodiments the sensor 120 comprises a housing 121 enclosing a first electrode 122 and a second electrode 123. The first electrode 122 is fix relative the housing 121, while the second electrode 123 is moveable relative the housing 121. The second electrode 123 is connected to a sensor body having the form of a moving member 124, partially protruding outside the housing 121 in a direction towards the structure 20. The moving member 124 may for this purpose be biased outwards by means of a spring 125. The sensor 120 further comprises an electronics unit 127 providing voltage to the electrodes 122, 123 and sending detection signals to the controller 150.

Figure 8A:
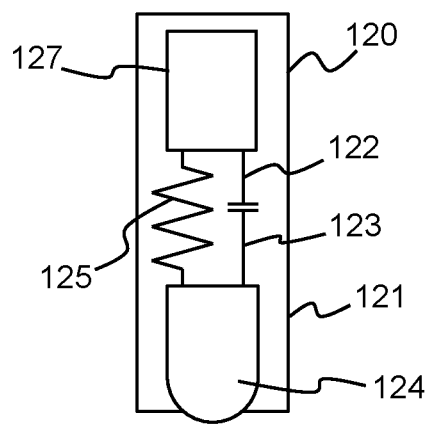
FIGS. 8a-b are side views of a sensor for use with a device according to an embodiment.
Figure 8B:
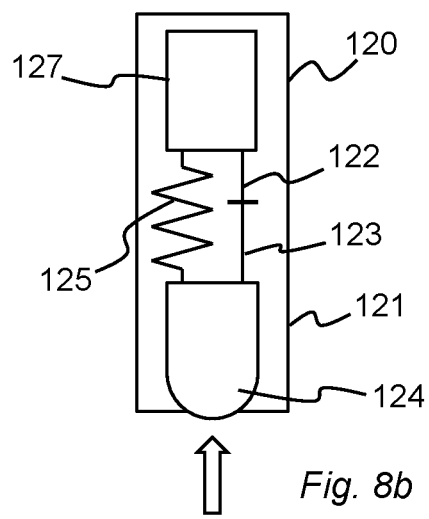

Starting in FIGS. 8a-b, the electrodes 122, 123 are arranged such that they are not establishing electrical contact when the sensor 120 is in an idle state, i.e. when there is no contact between the sensor 120 and the structure 20 (FIG. 8a). As soon as the sensor 120 comes into contact with the structure 20 (as the vibration device 110 presses the insert 10 towards the structure 20) the moving member 124 will be urged inwards, compressing the optional spring 125 whereby the electrodes 122, 123 will come into contact thus closing an electrical circuit (FIG. 8b). The controller 150 will consequently respond to this electrical signal, and issue a control signal to terminate the joining process.

Figure 9A:
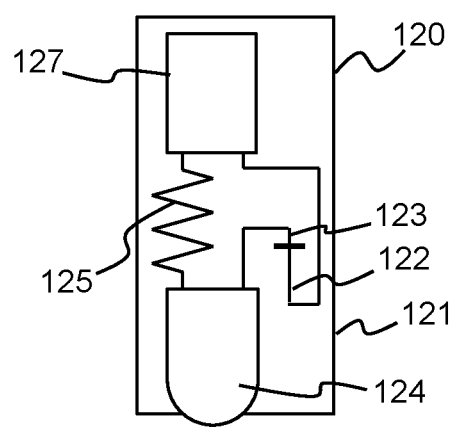
FIGS. 9a-b are side views of another sensor for use with a device according to an embodiment.
Figure 9B:
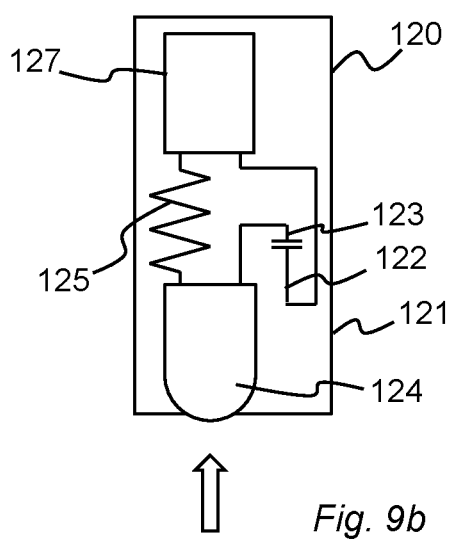

In FIG. 9a-b the electrodes 122, 123 are configured differently, as they are in fact in electrical connection when the sensor 120 is in the idle state (FIG. 9a). As soon as the sensor 120 comes into contact with the structure 20 (as the vibration device 110 presses the insert 10 towards the structure 20) the moving member 124 will be urged inwards, compressing the optional spring 125 whereby the electrodes 122, 123 will be separated thus cutting the electrical circuit (FIG. 9b). The controller 150 will consequently respond to this electrical signal, and issue a control signal to terminate the joining process accordingly. Optionally, the controller 150 may be omitted if the electrical circuit formed by the connection between the electrodes 122, 123 in fact were a part of the electrical circuit of the support 130 and the vibration transmission of the vibration device 110. As the circuit is cut off based on contact, the driving signal for the support 130 as well as the transmission signal for the vibration device 110 would automatically be terminated.

Figure 10:
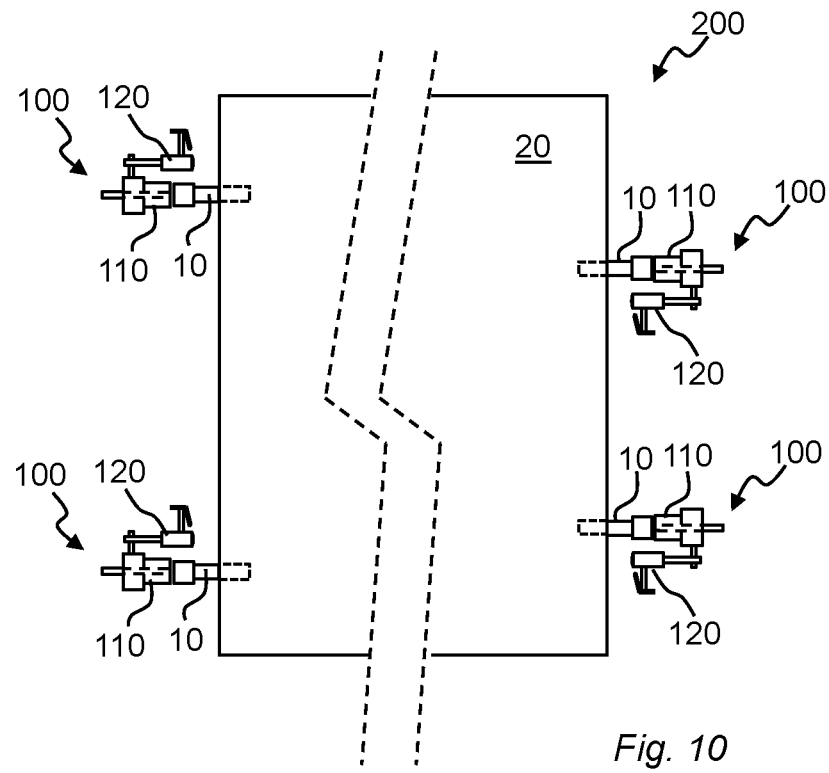
FIG. 10 is a top view of a system using several devices according to an embodiment.

In FIG. 10 a schematic setup of a material joining system 200 is shown. The system 200 may preferably be utilized for furniture manufacturing, in which dowels, intended for connecting a structure 20 to other furniture parts, are anchored as inserts 10 in the structure 20. The structure 20 may, e.g., be a shelf 3 as shown in FIG. 1. Several inserts 10 may simultaneously be attached to each lateral side of the structure 20 using a plurality of devices 100, one for each joining position. As each device 100 has its own sensor 120, an accurate positioning of every insert 10 is ensured even if there should be misalignment of the structure 20. Further to this, the use of the plurality of devices 100 also allows for use of different sizes of the inserts 10 in the various positions at the structure 20 as each device 100 may be adjusted such that the longitudinal distance d1 between the sensor body 124 of the respective sensor 120 and the insert contact surface 112 of the respective vibration device 110 may be set according to the desired length of the part of the individual insert 10 protruding outside the structure 20.

Figure 11:
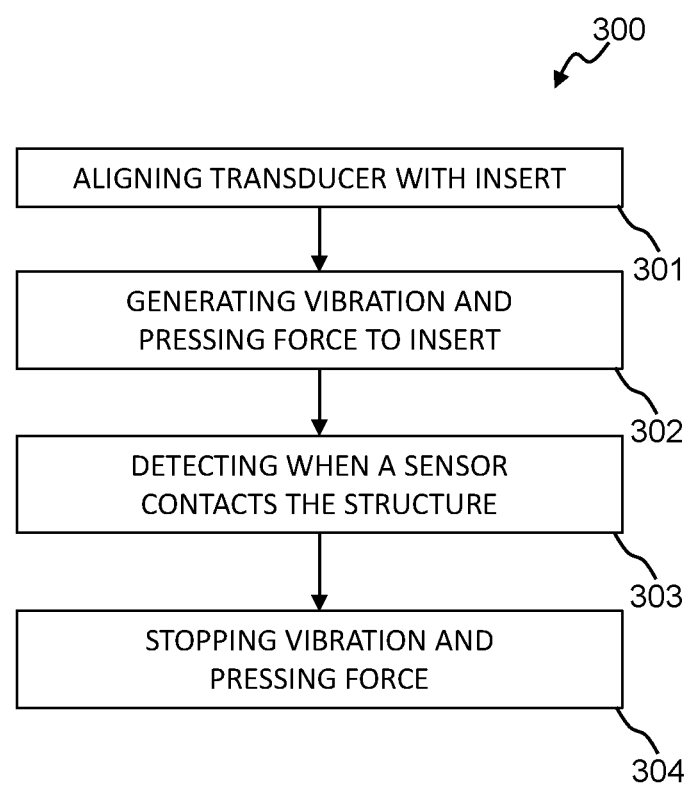
FIG. 11 is a schematic view of a method according to an embodiment.

In FIG. 11 a method 300 according to an embodiment is shown. The method 300 is performed in order to join material by anchoring an insert 10 in a structure 20 made of fibrous or porous material. The method 300 comprises a first step 301 of aligning a vibration device 110 with an insert 10, and a subsequent step 302 of controlling the vibration device 110 to generate vibrations as well as a pressing force to said insert 10. The method 300 also comprises a step 303 of detecting when a sensor 120 contacts a structure 20 in which the insert 10 is pressed into, and a final step 304 of stopping the vibration and pressing force once the contact is detected.

Figure 12:
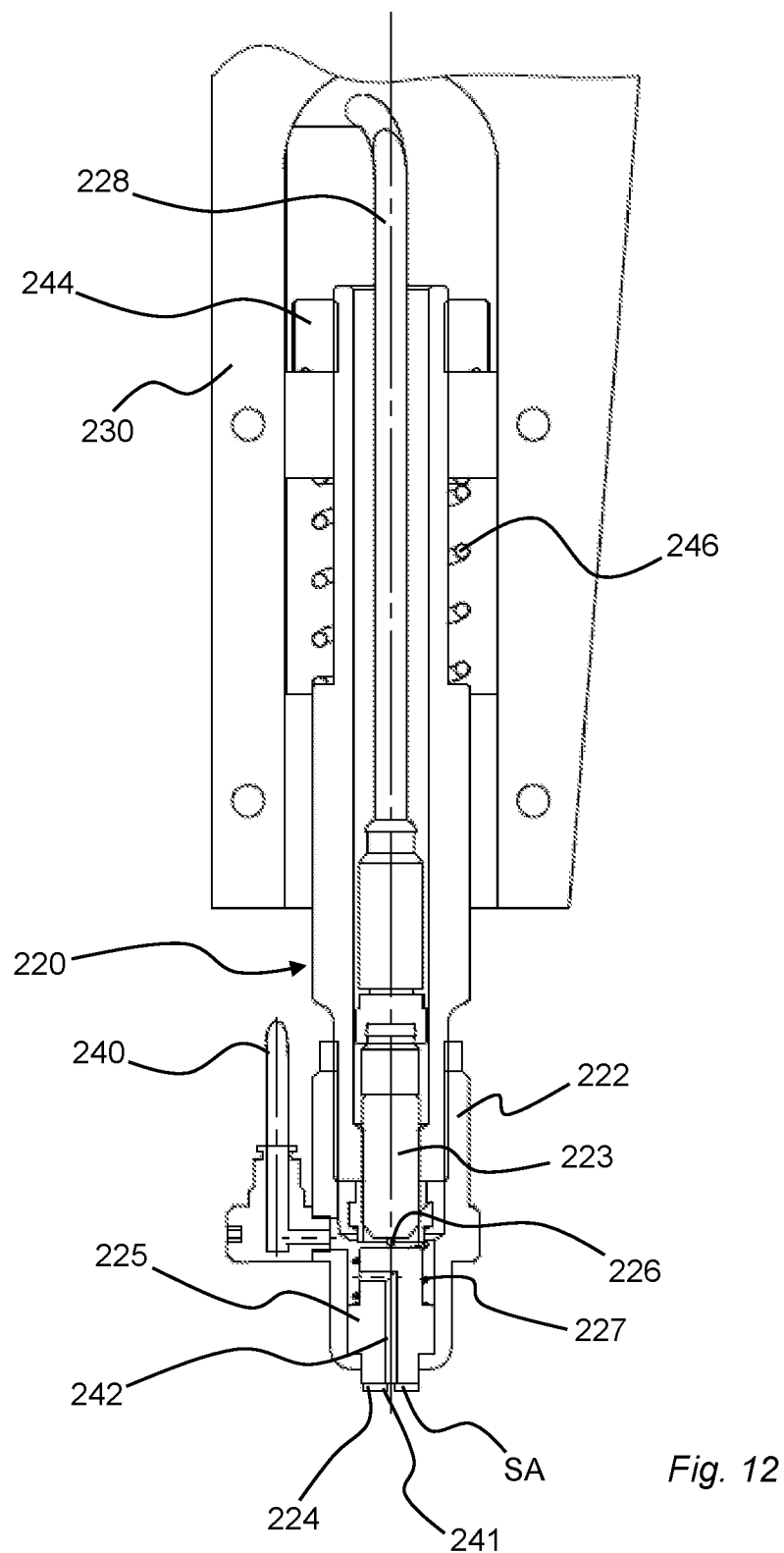
FIG. 12 is a schematic view of a contact sensor arrangement according to an alternative embodiment.

FIG. 12 illustrates a contact sensor 220 according to an alternative embodiment. This contact sensor 220 comprises a protective housing 222 inside which the actual sensor element 223 is located. The sensor element 223 may be the same type of element, e.g. Baumer My-com precision switch MY-COM L75N/S35L, as is used as the contact sensor 120 in the embodiment of FIGS. 6a-7, however, in contrast to that embodiment, in the embodiment of FIG. 12 the sensor element 223 is to come into indirect contact with the structure 20 (not illustrated in FIG. 12 in the interest of maintaining clarity of illustration). Hence, the contact sensor 220 is provided with a contacting element 225 extending out of the protective housing 222. At one end the contacting element 225 is provided with a sensor body 224 having a structure contact area SA adapted for contacting the structure, and at the opposite end the contacting element 225 is provided with a biasing end 226 adapted to bias the sensor element 223 when the sensor body 224 of the contacting element 225 comes into contact with the structure 20. A biasing spring 227 acts on the contacting element 225 such that it cannot contact the sensor element 223 when there is no contact between the sensor body 224 and the structure 20. A mounting bracket 230 is arranged for mounting the contact sensor 220 to the vibration device 110 (not shown in FIG. 12). A cable 228 is adapted to transmit signals from the sensor element 223 to the controller 150 (shown in FIG. 7) when a contact between the sensor body 224 of the contacting element 225 and the structure 20 has been transferred to the sensor element 223.

A gas supply 240 is connected to the protective housing 222. Flushing gas, such as compressed air, is supplied via the gas supply 240 and pressurizes the inside of the protective housing 222, such that contaminants cannot easily enter. A gas channel 242 is arranged inside the contacting element 225 for forwarding pressurized gas from the protective housing 222 to a nozzle 241 arranged in the sensor body 224 for gas-flushing the sensor body 224 and for removing any unwanted particles from the structure 20 or the sensor 220, to increase contact detection accuracy.

An adjustment screw 244 is provided for adjusting the distance d1, along the insertion direction ID, as illustrated in e.g. FIG. 6a, between the sensor body 224 and the insert contact surface 112 of the vibration device. A safety spring 246 is arranged for allowing the protective housing 222 to move away, in case of contact with an obstruction.

Although the present invention has been described above with reference to specific embodiments, it is not intended to be limited to the specific form set forth herein. Rather, the invention is limited only by the accompanying claims.

The invention claimed is:

1. A device for joining material by anchoring an insert comprising a first material in a structure comprising a second material, wherein the first material is solid and comprises thermoplastic properties and wherein the second material is solid and is penetrable by the first material when in a liquefied state, said device comprising:
    a vibration device being configured to transmit vibrations to said insert to cause at least partial liquefaction thereof and being arranged to move, relative to said structure, along an insertion direction (ID) to insert said insert at least partly into said structure,
    a contact sensor being connected to the vibration device and being adapted to move together with the vibration device along the insertion direction (ID), the contact sensor having a sensor body being adapted to detect contact with said structure, and
    a controller connected to the contact sensor and adapted for receiving a contact signal from the contact sensor indicating that the sensor body has come into contact with said structure, the controller comprising control means for interrupting, based on receipt of said signal, at least one of: i) a movement of the vibration device along the insertion direction (ID), and ii) a transmission of vibrations from the vibration device to said insert.

2. The device according to claim 1, wherein said vibration device is an ultrasonic vibration device.

3. The device according to claim 1, wherein a lateral distance (LI), as measured in a direction being perpendicular to the insertion direction (ID), between a centerline of the vibration device and a centerline of the contact sensor is less than seven, times a maximum lateral width, as measured in a direction being perpendicular to the insertion direction (ID), of said insert.

4. The device according to claim 1, wherein the contact sensor has a position detection repeat accuracy, as seen in the insertion direction (ID), of better than 20 micrometer.

5. The device according to claim 1, wherein the contact sensor has a response time of less than 3 millisecond.

6. The device according to claim 1, wherein the vibration device comprises an insert contact surface for transmitting vibrations to said insert, the sensor body being positioned at a distance (d1), as seen along the insertion direction (ID), from the insert contact surface of said vibration device, wherein the distance (d1) between the insert contact surface of the vibration device and the sensor body of the sensor corresponds to a height (HI) at which said insert is intended to extend from the structure in said insertion direction (ID) after said insert has been anchored in said structure.

7. The device according to claim 1, wherein the control means is adapted for interrupting, based on receipt of said signal, both i) the movement of the vibration device along the insertion direction (ID), and ii) the transmission of vibrations from the vibration device to said insert.

8. The device according to claim 1, wherein said contact sensor comprises a housing enclosing a first electrode being fix relative to the housing, and a second electrode being connected to the sensor body and being movable relative to the housing.

9. The device according to claim 8, wherein the second electrode is attached to the sensor body being a moving member being biased to protrude outside said housing.

10. The device according to claim 9, wherein the first and second electrodes are in contact when there is no contact force from said structure acting on the moving member.

11. The device according to claim 9, wherein the first and second electrodes are in non-contact when there is no contact force from said structure acting on the moving member.

12. The device according to claim 1, further comprising a support allowing the vibration device and the sensor to move towards and away from said structure along the insertion direction (ID).

13. The device according to claim 1, further comprising a gas supply having a flushing gas outlet located adjacent to the sensor body for gas-flushing the structure in front of the sensor body of the sensor.

14. A method for joining material by anchoring an insert comprising a first material in a structure comprising a second material, such as a fibrous or porous material, wherein the first material is solid and comprises thermoplastic properties and wherein the second material is solid and is penetrable by the first material when in a liquefied state, said method comprising:
    aligning a vibration device with an insert;
    controlling said vibration device to transmitting vibrations, to cause at least partial liquefaction of said insert, as well as generating a pressing force in an insertion direction (ID) to said insert to press said insert at least partly into said structure;
    detecting when a sensor, which is connected to said vibration device and which moves together with the vibration device in the insertion direction (ID), contacts said structure into which the insert is pressed, and interrupting at least one of said transmitting of vibrations and said generation of a pressing force by said vibration device once the contact between the sensor and said structure is detected.

15. The method according to claim 14, wherein the step of interrupting at least one of said transmitting of vibrations and said generation of a pressing force by said vibration device once the contact between the sensor and said structure is detected involves interrupting both said transmitting of vibrations and said generation of a pressing force.

16. The method according to claim 14, wherein said step of detecting a contact with the structure involves detecting said contact at a lateral distance (LI), as measured in a direction being perpendicular to the insertion direction (ID), between a centerline (CI) of the vibration device and a centerline of the contact sensor of less than seven, times a maximum lateral width, as measured in a direction being perpendicular to the insertion direction (ID), of said insert.

17. The method according to claim 14, wherein the step of detecting when the sensor contacts said structure is performed using a position detection repeat accuracy of the sensor, as seen in the insertion direction (ID), of better than 20 micrometer.

18. The method according to claim 14, wherein the step of detecting when the sensor contacts said structure is performed using a sensor response time of less than 3 milliseconds.

19. The method according to claim 14, wherein an area of the structure in front of the contact sensor is flushed with a flushing gas.

20. The method according to claim 14, further comprising setting a distance (d1) between an insert contact surface of the vibration device and a sensor body of the sensor such that it corresponds to a height (HI) at which said insert is intended to extend from the structure in said insertion direction (ID) after said insert has been anchored in said structure.

21. The method according to claim 14, wherein said structure comprises a wood based material, such as wood, plywood, chipboard, cardboard, medium or high density fiber board (MDF, HDF).

22. The method according to claim 14, wherein the insert is a dowel for later use as a male part of a furniture joint formed when joining the structure being a furniture piece to a further furniture piece.

23. The method according to claim 14, wherein the insert is a dowel for later use as a female part of a furniture joint formed when joining the structure being a furniture piece to a further furniture piece.

\* \* \* \* \*